US012594761B2

(12) United States Patent
Maruyama

(10) Patent No.: US 12,594,761 B2
(45) Date of Patent: Apr. 7, 2026

(54) LIQUID EJECTION HEAD AND PRINTING APPARATUS

(71) Applicant: CANON KABUSHIKI KAISHA, Tokyo (JP)

(72) Inventor: Ayako Maruyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 18/230,299

(22) Filed: Aug. 4, 2023

(65) Prior Publication Data

US 2024/0051295 A1 Feb. 15, 2024

(30) Foreign Application Priority Data

Aug. 12, 2022 (JP) ................................ 2022-129055

(51) Int. Cl.
*B41J 2/14* (2006.01)

(52) U.S. Cl.
CPC ....... *B41J 2/14233* (2013.01); *B41J 2/14201* (2013.01); *B41J 2/1433* (2013.01); *B41J 2/14137* (2013.01); *B41J 2202/15* (2013.01)

(58) Field of Classification Search
CPC .. B41J 2/14233; B41J 2/14201; B41J 2/1433; B41J 2/14137; B41J 2202/15
See application file for complete search history.

(56) References Cited

U.S. PATENT DOCUMENTS

| | | | | |
|---|---|---|---|---|
| 8,967,775 | B2 * | 3/2015 | Arai | B41J 2/1621 347/71 |
| 10,226,922 | B2 * | 3/2019 | Kusunoki | B41J 2/04588 |
| 2012/0056947 | A1 | 3/2012 | Tanuma et al. | |

FOREIGN PATENT DOCUMENTS

| | | | |
|---|---|---|---|
| JP | 2012-071587 | A | 4/2012 |
| JP | 2014-172323 | A | 9/2014 |

* cited by examiner

*Primary Examiner* — Geoffrey S Mruk
(74) *Attorney, Agent, or Firm* — Venable LLP

(57) ABSTRACT

A liquid ejection head being for liquid suction and wipe operations and enabling diaphragm plates to achieve proper amounts of displacement with low drive voltage includes first and second substrates. Ejection ports for ejecting liquid are provided at a flat first surface of the first substrate. Drive elements are provided on a second surface of the first substrate. The second substrate is joined to the second surface of the first substrate, forming pressure chambers configured to be supplied with liquid. Pressure-chamber forming portions of the first substrate form the diaphragm plates. The liquid in the pressure chambers is ejected from the ejection ports upon displacement of the diaphragm plates. The second surface of the first substrate includes the drive elements and is uneven. In the diaphragm plates, second regions surrounding first regions provided with the ejection ports have lower rigidity than the first regions.

21 Claims, 11 Drawing Sheets

| BOARD | RATIO OF DISPLACEMENT VOLUME (pL/V) |
|---|---|
| BOARD 1 (FIG. 4) | 1.00 |
| BOARD 1A (FIG. 5) | 0.43 |
| BOARD 1B (FIG. 6) | 0.03 |
| BOARD 1C (FIG. 7) | 0.09 |

FIG.8

LIQUID EJECTION HEAD AND PRINTING APPARATUS

BACKGROUND OF THE INVENTION

Field of the Invention

The present disclosure relates to a liquid ejection head capable of ejecting liquid such as ink and also relates to a printing apparatus.

Description of the Related Art

In view of the needs to print high-definition images at high speed, inkjet printing apparatuses in recent years are desired to have a liquid ejection head in which ejection ports are densely arranged. To meet such needs, among liquid ejection heads using piezoelectric elements, bend-mode liquid ejection heads are widely used because they are relatively easy to arrange piezoelectric elements densely and precisely. In a bend-mode liquid ejection head, a pressure chamber has an inner wall formed by a stack structure made up of a piezoelectric element and a diaphragm plate, and pressure is generated inside the pressure chamber by application of voltage to deform the piezoelectric element in the in-plane direction and deform the diaphragm plate in the out-of-plane direction (bending deformation).

Japanese Patent Laid-Open Nos. 2014-172323 and 2012-71587 disclose bend-mode liquid ejection heads. In the liquid ejection head disclosed in Japanese Patent Laid-Open No. 2014-172323, a substrate where ejection ports (nozzles) are formed is disposed in such a way as to close the pressure chambers, and regions of the substrate that are not fixed by the walls of the pressure chambers serve as diaphragm plates. Electrodes and piezoelectric elements are formed at a surface of the diaphragm-plate-forming regions of the substrate, and the liquid is ejected from the ejection ports by deformation of the piezoelectric elements.

Also, Japanese Patent Laid-Open No. 2012-71587 shows a nozzle plate configured as follows: first electrodes, piezoelectric elements, and a second electrode are formed on a substrate where ejection ports (nozzles) are formed, and a metal material is formed on the second electrode to cover the entire substrate. The bend-mode liquid ejection head is formed by joining of the metal-material-side surface of the nozzle plate and one side of a base member where openings to serve as pressure chambers are provided.

In the configuration in Japanese Patent Laid-Open No. 2014-172323, the substrate is uneven at its nozzle-formed surface which is opposite from the pressure chambers because the electrodes and the piezoelectric elements are formed. Thus, to fill the unevenness, a protective film and a waterproof film are formed so that the surface of the substrate may be formed into a flat planar shape. This allows a cap member to come into close contact with the surface of the substrate. The close contact of the cap member makes it possible to perform a suction operation for sucking the ink from the surface of the substrate and also makes it possible to properly perform a wipe operation for wiping off ink and dust attached to the surface of the substrate with a wiper. However, forming a protective film and a waterproof film on the surface of the diaphragm plates makes the diaphragm plates thicker and harder to deform. Meanwhile, in Japanese Patent Laid-Open No. 2012-71587, the surface of the diaphragm plate is not uneven, but the entire diaphragm plate is covered with the metal material, which makes the diaphragm plate more rigid and deform by a smaller amount.

In this way, in the configurations provided by the techniques described in Japanese Patent Laid-Open Nos. 2014-172323 and 2012-71587, the diaphragm plates are hard to deform, and in order for the diaphragm plates to achieve a satisfactory amount of deformation, it is necessary to apply a larger drive voltage to the piezoelectric elements.

SUMMARY OF THE INVENTION

The present disclosure aims to provide a liquid ejection head and a printing apparatus using the same, the liquid ejection head being suitable for liquid suction and wipe operations and enabling diaphragm plates to achieve proper amounts of displacement with low drive voltage.

In a first aspect of the present disclosure, there is provided a liquid ejection head comprising: a first substrate having a first surface and a second surface, the first surface being flat and provided with an ejection port for ejecting liquid, the second surface being opposite from the first surface and provided with a drive element; and a second substrate joined to the second surface of the first substrate and forming a pressure chamber between the second substrate and the second surface of the first substrate, the pressure chamber being configured to be supplied with the liquid, wherein a portion of the first substrate that forms the pressure chamber forms a diaphragm plate to be displaced by the drive element and is configured to eject the liquid in the pressure chamber from the ejection port upon displacement of the diaphragm plate, the second surface of the first substrate has an uneven shape including the drive element, and compared to a first region of the diaphragm plate where the ejection port is provided, a second region of the diaphragm plate surrounding the first region has low rigidity.

In a second aspect of the present disclosure, there is provided a printing apparatus comprising: a liquid ejection head; a conveyance unit configured to convey a printing medium relative to the liquid ejection head; and a liquid supply unit configured to supply liquid to the liquid ejection head, wherein the printing apparatus forms an image on the printing medium by ejecting the liquid supplied from the liquid supply unit from an ejection port of the liquid ejection head to the printing medium, wherein the liquid ejection head includes a first substrate having a first surface and a second surface, the first surface being flat and provided with an ejection port for ejecting liquid, the second surface being opposite from the first surface and provided with a drive element and a second substrate joined to the second surface of the first substrate and forming a pressure chamber between the second substrate and the second surface of the first substrate, the pressure chamber being configured to be supplied with the liquid, a portion of the first substrate that forms the pressure chamber forms a diaphragm plate to be displaced by the drive element and is configured to eject the liquid in the pressure chamber from the ejection port upon displacement of the diaphragm plate, the second surface of the first substrate has an uneven shape including the drive element, and compared to a first region of the diaphragm plate where the ejection port is provided, a second region of the diaphragm plate surrounding the first region has low rigidity.

Further features of the present invention will become apparent from the following description of exemplary embodiments with reference to the attached drawings.

BRIEF DESCRIPTION OF THE DRAWINGS

FIG. 8 is a diagram showing the displacement volumes of a pressure chamber per unit voltage of the respective substrates in FIGS. 4A to 7:

DESCRIPTION OF THE EMBODIMENTS

Embodiments of the present disclosure are described in detail below with reference to the drawings attached hereto. Note that the embodiments below are not intended to limit the present invention according to the scope of claims, and not all the combinations of features described in the present embodiments are necessarily essential as solving means provided by the present invention. Also, although an inkjet head forming an image by ejecting ink as liquid is described below among liquid ejection heads, the liquid ejection head of the present disclosure can also be applied to one that ejects liquid other than ink.

First Embodiment

Figure 1A:
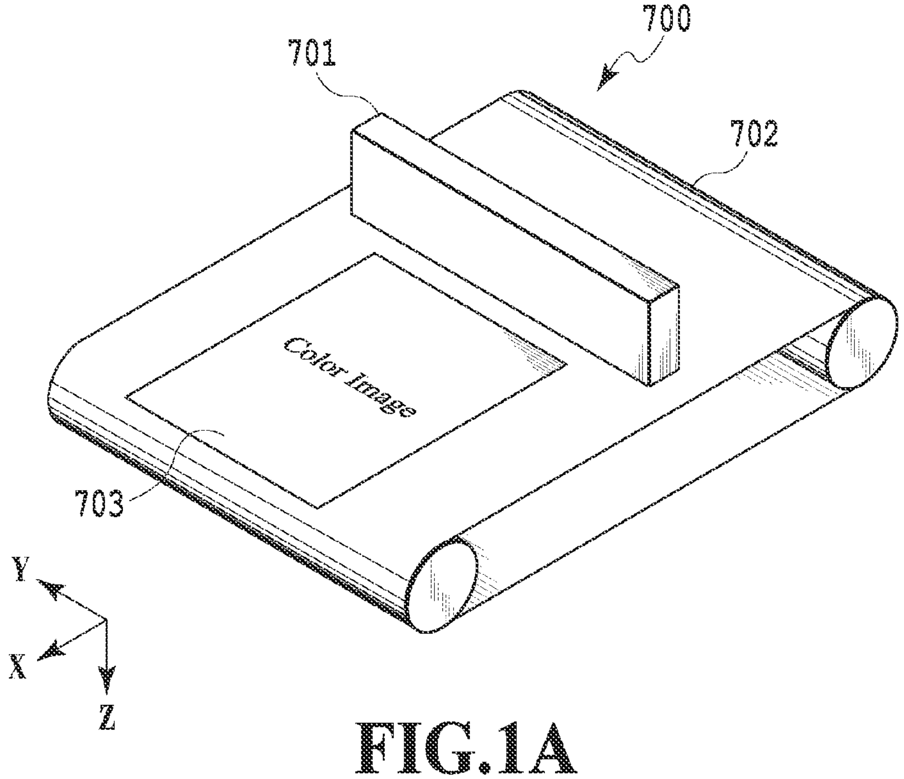
FIG. 1A is a schematic diagram of an inkjet printing apparatus.

FIG. 1A is a diagram showing a schematic configuration of an inkjet printing apparatus 700 (hereinafter referred to simply as a printing apparatus 700) of the present embodiment. As shown in FIG. 1A, a sheet-shaped printing medium 703 is conveyed in an X-direction by a conveyance unit 702 and passes below a print unit 701 at a predetermined speed. The print unit 701 is mainly formed by a liquid ejection head 100 (to be described later). The liquid ejection head 100 has a plurality of ejection ports arranged in a direction (a Y-direction) intersecting with (in the present embodiment, orthogonal to) the conveyance direction of the printing medium, covering a range corresponding to the width of the printing medium. The ejection ports eject droplets of ink, which is liquid containing a color material. In the event where the printing medium 703 passes below the liquid ejection head 100, drive elements (to be described later) provided in correspondence with the ejection ports of the liquid ejection head 100 are driven according to ejection data and eject ink in a Z-direction from the ejection ports toward the printing medium, thereby printing an image. In this way, the printing apparatus 700 of the present embodiment is a full-line printing apparatus, which performs printing by ejecting ink from an array of ejection ports arranged in the width direction of the printing medium 703 (the Y-direction) while conveying the printing medium 703 continuously.

Figure 1B:
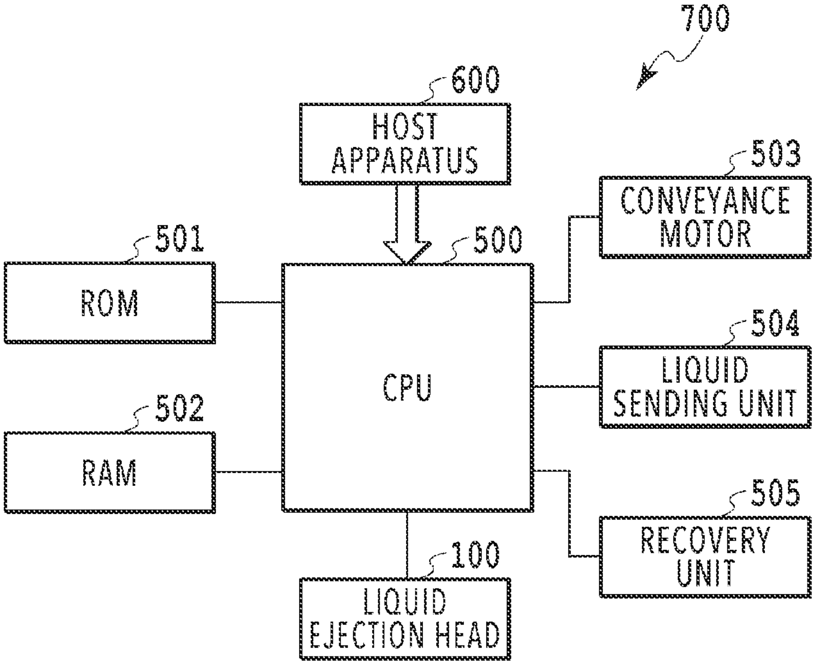
FIG. 1B is a block diagram showing the control configuration of the inkjet printing apparatus.

FIG. 1B is a block diagram showing the control configuration of the printing apparatus of the present embodiment and of a second embodiment (to be described later). The printing apparatus 700 includes a CPU 500, a ROM 501, and a RAM 502. The CPU 500 performs overall control of the units of the printing apparatus 700 by following the programs stored in the ROM 501 and using the RAM 502 as a work area. For example, in accordance with the programs and parameters stored in the ROM 501, the CPU 500 performs predetermined image processing on image data received from an externally-connected host apparatus 600 and thereby generates ejection data for driving drive elements of the liquid ejection head 100. The CPU 500 drives the liquid ejection head 100 according to the ejection data so that the liquid ejection head 100 may eject ink at a predetermined frequency. Meanwhile, the CPU 500 conveys the printing medium 703 in the X-direction by driving a conveyance motor 503 provided at the conveyance unit 702 at a speed corresponding to the ejection frequency of the ejection operation performed by the liquid ejection head 100. As a result, an image in accordance with the image data received from the host apparatus 600 is printed on the printing medium 703.

A liquid feed unit 504 is a unit for supplying liquid (ink) to the liquid ejection head 100. Under the control of the CPU 500, the liquid feed unit 504 controls components therein, such as a pressure control unit and a switching mechanism, and controls the flow of ink through an ink flow path including the liquid ejection head 100. The liquid feed unit 504 may be one that functions as a liquid supply unit that supplies ink to the liquid ejection head 100 or as a liquid circulation unit that circulates ink in an ink circulation path including the liquid ejection head 100. In a case where the liquid feed unit 504 is one functioning as a liquid circulation unit (a circulation unit), the liquid feed unit 504 performs supply of ink to the liquid ejection head 100 and collection of ink from the liquid ejection head 100.

A recovery unit 505 is a unit that performs a process for maintaining and recovering the liquid (ink) ejection performance of the liquid ejection head 100 and is controlled by the CPU 500. The recovery unit 505 includes a suction unit that forcibly sucks liquid out of the liquid-ejecting ejection ports of the liquid ejection head 100 and a wiping unit that performs a wipe operation to wipe off foreign matter such as minute droplets and dust attached to the surface of the liquid ejection head 100. The suction unit includes a cap member provided such that it can come into contact with and move away from the surface of the liquid ejection head and a negative pressure generation unit connected to the cap member. The suction unit can perform a suction operation for forcibly sucking gas and liquid out of the ejection ports of the liquid ejection head 100 by driving the negative generation unit with the cap member in close contact with the surface of the ejection head 100. This suction operation is executed in, e.g., an operation such as a filling operation for filling the pressure chambers and the ejection ports of the liquid ejection head 100 with liquid or a suction recovering operation for expelling thickened liquid (ink) or the like in the ejection ports and replacing it with liquid (ink) suitable for ejection. Also, the wiping unit is formed by a wiper that moves in abutment with the surface of the liquid ejection head 100 and a wiper driving unit that enables the movement. By causing the wiper driving unit to move the wiper with the wiper in abutment with the surface of the liquid ejection head 100, the wiping unit can wipe off foreign matter attached to the surface of the liquid ejection head 100.

Figure 2:
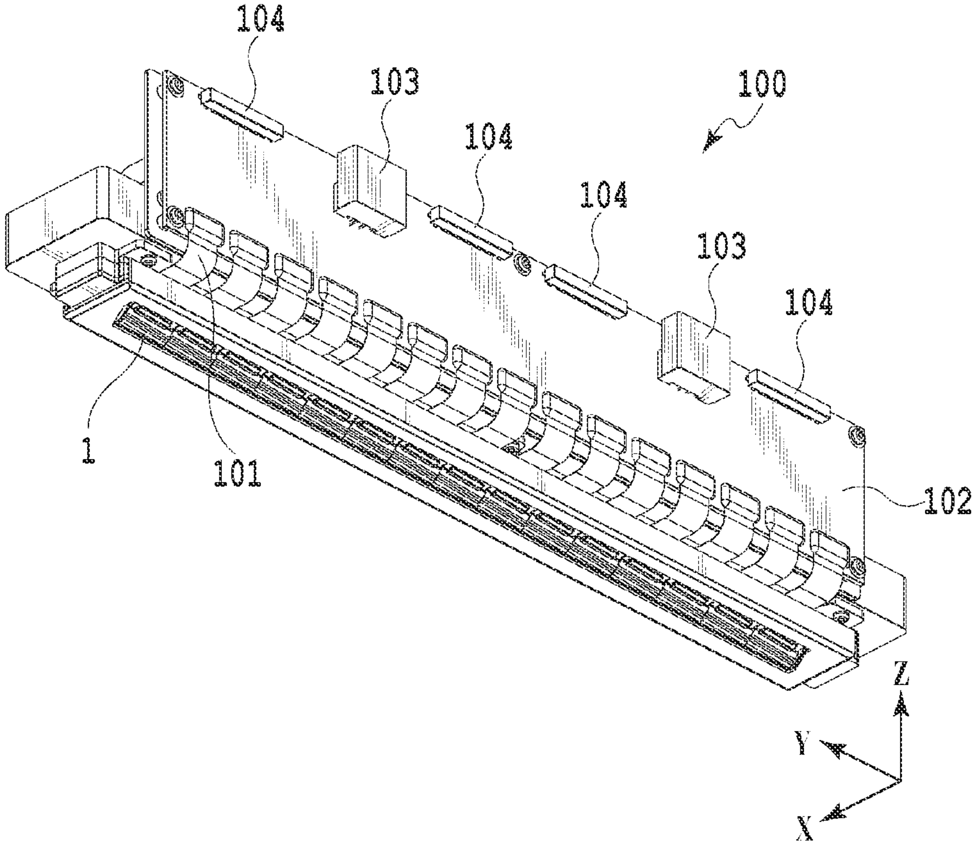
FIG. 2 is a perspective view showing the overall configuration of a liquid ejection head of embodiments.

FIG. 2 is a perspective view showing the overall configuration of the liquid ejection head 100. The liquid ejection head 100 includes substrates 1, an electric wiring substrate 102 electrically connected to the substrates 1 via flexible wiring circuits 101, power supply terminals 103 for control of ink (liquid) ejection, and input terminals 104 into which control signals and the like are inputted. In one example of a method for supplying ink to the liquid ejection head 100, ink is supplied from an ink tank provided upstream of the liquid ejection head 100 to pressure chambers in the liquid ejection head 100 by using capillary action or a pump. In one of other examples of a method for supplying ink into the pressure chambers of the liquid ejection head 100, ink tanks are provided at an upstream flow channel and at a downstream flow channel of the liquid ejection head 100, and ink is caused to flow from one of the ink tanks to the other.

At the liquid ejection head 100, the plurality of substrates 1 are arranged in the Y-direction. Each substrate 1 has a plurality of densely-arranged ejection ports so that these ejection ports cover a 20-mm print width in the Y-direction. The liquid ejection head 100 of the present embodiment is a long full-line inkjet head having a plurality of substrates 1 arranged in the Y-direction to support printing media in A4 size and the like. As a result of the arrangement of the plurality of substrates 1, an ejection port array longer than the width of an A4-size print medium in the Y-direction is formed at the liquid ejection head 100.

Figure 3:
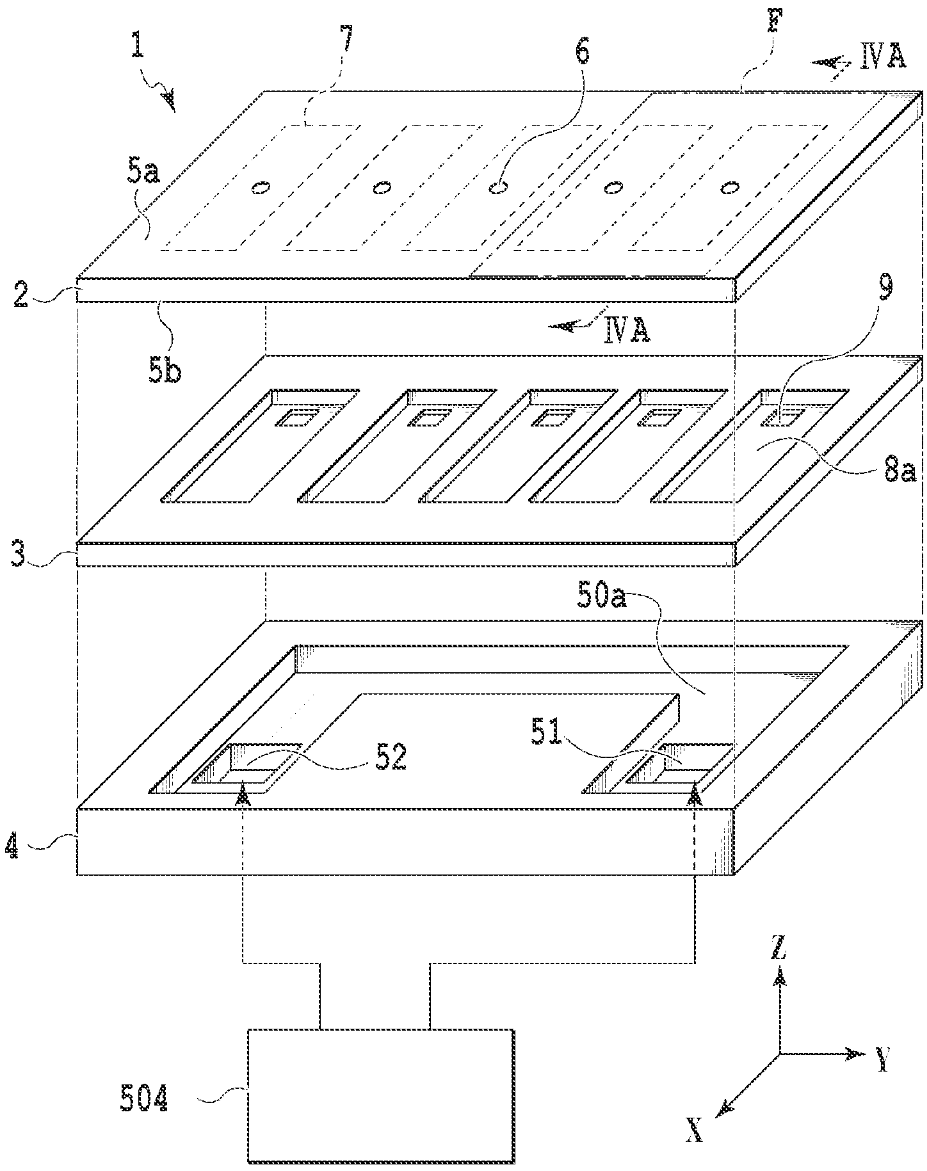
FIG. 3 is an exploded perspective view showing part of a substrate of the liquid ejection head in an enlarged manner.
Figure 4A:
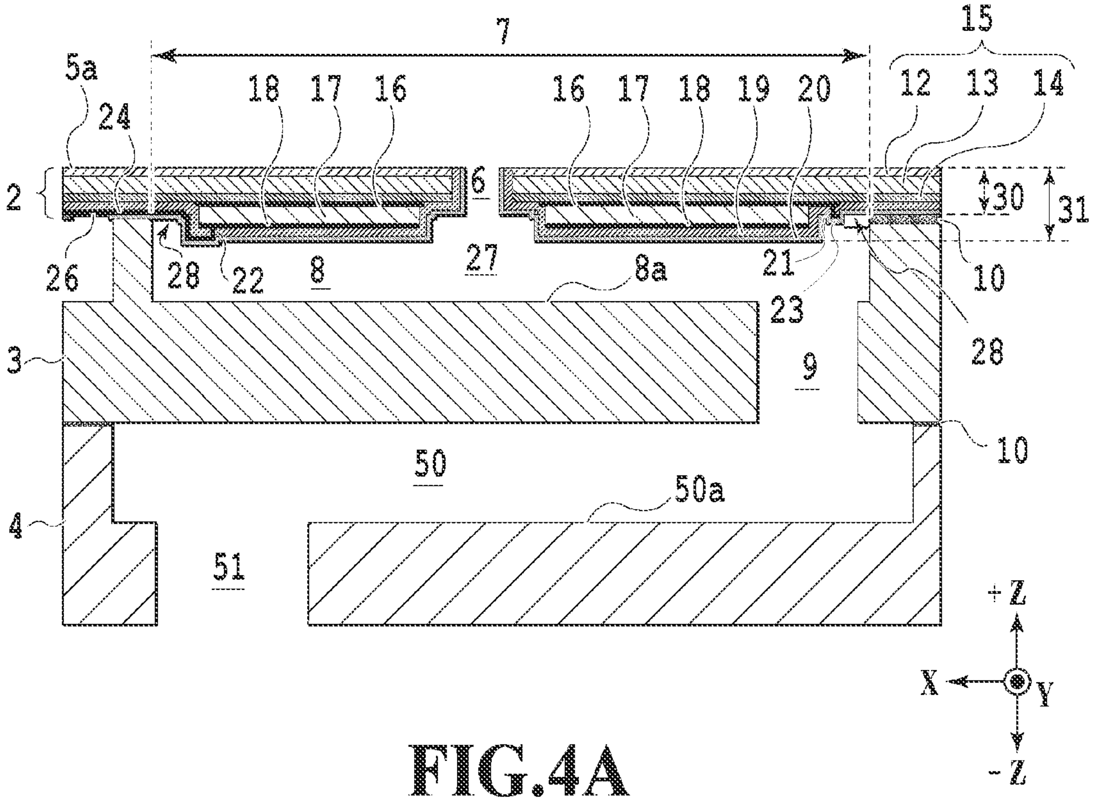
FIG. 4A is a sectional view taken along the line IVA-IVA in FIG. 3.
Figure 4B:
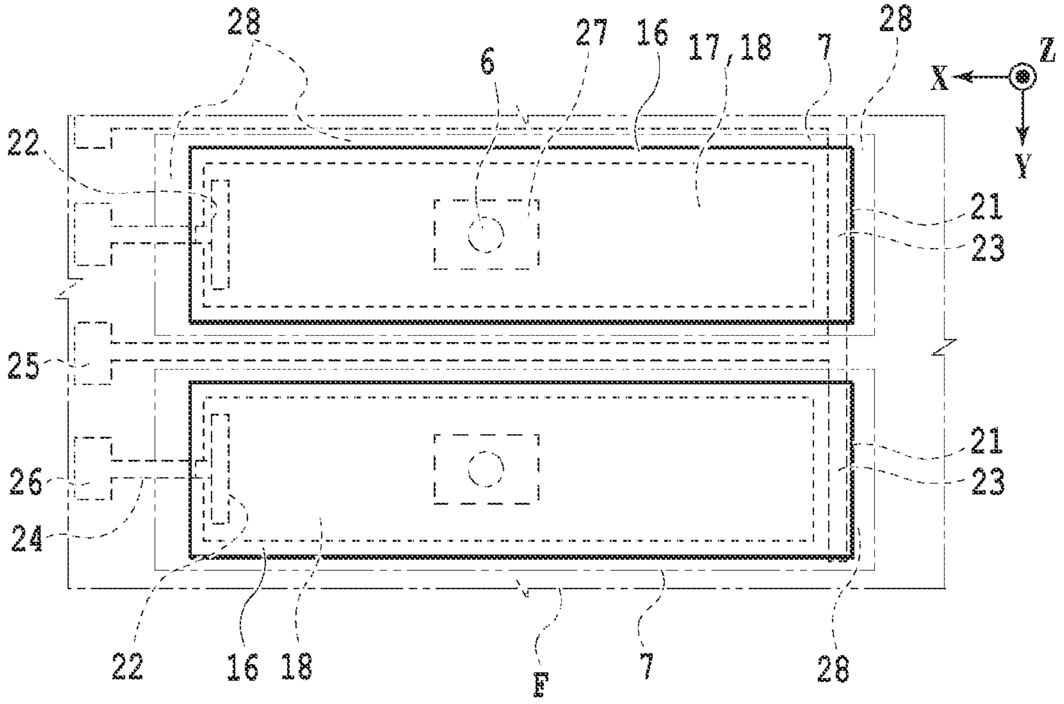
FIG. 4B is a plan view of a region F shown in FIG. 3.

Now, the configuration of each substrate 1 forming the liquid ejection head 100 of the present embodiment is described based on FIGS. 3, 4A, and 4B. FIG. 3 is an exploded perspective view showing part of the substrate 1 forming the liquid ejection head 100 in an enlarged manner. Also, FIG. 4A is a sectional view taken along the line IVA-IVA in the substrate 1 shown in FIG. 3, and FIG. 4B is a plan view of a region F of the substrate in FIG. 3A surrounded by a dash-dot line, the region F being seen from the front surface 5*a* (the first surface) side of a first substrate 2. Note that for the illustration convenience, FIG. 4B shows a planar shape of the substrate 1 shown in FIG. 4A without showing a base substrate 15.

Although FIG. 3 shows a configuration where the substrate 1 has five ejection ports 6 arranged in the Y-direction for simplification, the substrate 1 actually has 120 ejection ports 6 arranged in the Y-direction at a 150 dpi (169.3 μm) interval, and eight ejection port arrays each formed by those 120 ejection ports are arranged in the X-direction at a 1000 μm interval. The eight ejection port arrays are displaced in the Y-direction by 1200 dpi (21.2 μm) each, which enables the ejection ports 6 to be arranged densely in the Y-direction. Note that the arrangement of the ejection ports 6 is not limited to the above.

The configuration of the substrate 1 is described with reference to FIGS. 3, 4A, and 4B. The substrate 1 includes the first substrate 2, a second substrate 3, and a third substrate 4. These three substrates 2, 3, 4 are, as shown in FIG. 4A, stacked sequentially and joined together with an adhesive 10. Note that in FIGS. 3, 4A, and 4B, the upper surfaces of the substrates 2, 3, 4 are referred to as front surfaces, and the lower surfaces as back surfaces.

As shown in FIG. 3, the ejection ports 6 are formed at the first substrate 2, penetrating the first substrate 2. Recessed portions (first recessed portions) 8*a* for forming pressure chambers 8 (see FIG. 4A) are formed at the second substrate 3 at positions corresponding to the respective ejection ports 6, and a first opening (pressure chamber opening) 9 is formed at each recessed portion 8*a*, penetrating the second substrate 3. By joining of the front surface of the second substrate 3 and the back surface of the first substrate 2 with the adhesive 10, spaces are formed between the first substrate 2 and the second substrate 3 as shown in FIG. 4A, the spaces serving as the pressure chambers 8. In the example shown in FIGS. 3, 4A, and 4B, because five ejection ports 6 are formed at the first substrate 2, five pressure chambers 8 are formed in correspondence with the respective ejection ports 6 and communicate with the respective ejection ports 6. Also, the joint portions between the first substrate 2 and the second substrate 3 serve as the partitioning walls of the pressure chambers 8, and regions inside of and surrounded by these partitioning walls, i.e., regions forming the upper inner walls of the pressure chambers 8, form displaceable diaphragm plates 7.

A recessed portion (second recessed portion) 50*a* for forming a first shared flow channel 50 (see FIG. 4A) is formed at the third substrate 4, the first shared flow channel 50 being capable of communicating with the first openings 9 formed in the respective recessed portions 8*a* in the second substrate 3. As shown in FIG. 4A, by joining of the front surface of the third substrate 4 and the back surface of the second substrate 3 with the adhesive 10, the first shared flow channel (first flow channel) 50 is formed, communicating with all the first openings 9 formed at the second substrate 3. Also, a second opening (first flow channel opening) 51 and a third opening (second flow channel opening) 52 are formed at one end portion and the other end portion of the recessed portion 50*a*, respectively, penetrating the third substrate 4 as flow channel openings. The second opening 51 and the third opening 52 are connected to the external liquid feed unit 504, and ink supplied from the liquid feed unit 504 is supplied to the first shared flow channel 50 via the second opening 51 and the third opening 52.

Now, a sectional structure and a planar shape of the substrate 1 are described with reference to the sectional view in FIG. 4A and the plan view in FIG. 4B. As shown in FIG. 4A, the first substrate 2 has a first electrode 16, a piezoelectric film 17, a second electrode 18, a first insulating film 19, a first protective film 20, and the base substrate 15. Further, the first substrate 2 has the ejection port 6 penetrating the first substrate 2 and a step 27 formed by an encircling recessed portion surrounding the ejection port 6 and communicating with the ejection port 6.

The base substrate 15 is formed by a silicon layer 13, an insulating film 12 provided on the front surface of the silicon layer 13, and an insulating film 14 provided on the back surface of the silicon layer 13, which is opposite from the front surface thereof. The front surface of the insulating film 12 of the base substrate 15 forms the front surface 5*a* (first surface) of the first substrate 2. The front surface of the insulating film 12, i.e., the surface where the rim portion of the opening of the ejection port 6 (an end edge portion of the ejection port 6 located toward the front in the ink ejection direction) is formed. The front surface 5*a* of the first substrate 2 has a flat planar shape. Because the front surface 5*a* of the base substrate 15 is exposed to liquid and outside air, the insulating films 12, 14 are preferably ones that keep the silicon layer 13 and the outside insulated from each other. However, in a case where a water-based solution is not used or where the front surface 5*a* is not exposed to the outside air, the base substrate 15 may be configured without the insulating film 12. Also, because the first electrode 16 is formed on the back surface side of the base substrate 15 (the −Z-direction side in FIG. 4A), it is preferable that the insulating film 14 be formed at the base substrate 15. Although the base substrate 15 of the present embodiment is configured such that the silicon layer 13 is sandwiched between the $SiO_2$ insulating films 12, 14, it is to be noted that the base substrate 15 may be configured only by the insulating films 12, 14. Also, the base substrate 15 may be formed using other materials such as $SiO_2$, $Al_2O_3$, $HfO_2$, or DLC. The base substrate 15 preferably includes the insulating film 14 because the insulating film 14 can also be used as an etching stopper layer in the formation of the first electrode 16. The base substrate 15 suited for desired characteristics and a desired manufacturing method is preferably used.

The first electrode 16, which is a shared electrode, is formed on the back (lower) surface side of the base substrate 15. Pt is used for this first electrode 16. The piezoelectric film 17, which is made of lead zirconate titanate, is formed on the lower side of the first electrode 16. In the formation of the piezoelectric film 17, lead may diffuse into the film therearound due to high-temperature sintering. To prevent the lead diffusion, it is preferable to form a ZrO or $TiO_2$ film between the insulating film 14 and the first electrode 16 as a lead diffusion prevention film, and in a case of forming a $TiO_2$ film, the Ti film may be formed between the insulating film 14 and the first electrode 16 as a contact improvement layer. Also, other materials such as lead titanate, zinc oxide, or aluminum nitride may be used for the piezoelectric film 17.

The second electrode 18 which is an individual electrode and made of TiW is formed on the back (lower) surface side of the piezoelectric film 17. The second electrode 18 may be formed of other materials such as Pt, Ru, or Ir. After a film of TiW to be the second electrode 18 is formed, patterning and etching through resist application and photolithography are performed so that the second electrode 18 and the piezoelectric film 17 can be formed into desired shapes. After that, patterning and etching through resist application and photography are performed so that the first electrode 16 can be formed into a desired shape. By repeating a similar step, the ejection port 6 can be formed. The first insulating film 19 made of $SiO_2$ is formed on the back (lower) surface side of the second electrode 18 to insulate the first electrode 16 and the second electrode 18. Other material such as $Al_2O_3$ or SiN may be used for the first insulating film 19, and the first insulating film 19 also functions as a surface protective film for the piezoelectric film 17 and the ejection port 6.

In part of the first insulating film 19, a first contact hole 21 and a second contact hole 22 are formed for connection of electric wiring for electrically connecting the first electrode 16 and the second electrode 18. An electric wiring layer made of AlCu is formed on the back (lower) surface side of the first insulating film 19. First electric wiring 23, second electric wiring 24, a first electrode pad 25 (FIG. 4B), and a second electrode pad 26 are formed at the electric wiring layer. The first electric wiring 23 electrically connects the first electrode 16 to the first electrode pad 25 via the first contact hole 21. The second electric wiring 24 electrically connects the second electrode 18 to the second electrode pad 26 via the second contact hole 22. A Ti film may be formed between the first insulating film 19 and the electric wiring layer to improve adhesiveness. Also, the electric wiring layer may be formed of other materials.

The first protective film 20 formed of a SiN film is formed on the back (lower) surface side of the electric wiring layer. Other materials, such as $SiO_2$, $Al_2O_1$, $HfO_2$, or DLC, may be used to form the first protective film 20 as long as the material keeps the electric wiring layer insulated and moisture-proof. However, in a case where a water-based solution is not used or where there is no exposure to the outside air, the electric wiring layer may be configured without the first protective film 20, or the first protective film 20 may be formed at only part of the diaphragm plate 7 to make the diaphragm plate 7 more deformable. The first electrode 16, the piezoelectric film 17, and the second electrode 18 that are provided on the lower surface side of the diaphragm plate 7 in the first substrate 2 configured as described above are collectively referred to as a drive element. Aback surface 5*b* (a second surface) of the first substrate 2 including this drive element has an uneven shape, and the back surface 5*b* of the first substrate 2 forms an inner wall of the pressure chamber 8.

As described earlier, the step 27 is formed at the first substrate 2, communicating with the ejection port 6. As shown in FIG. 4B, the step 27 is formed over a region larger than the diameter of the ejection port 6, surrounding the ejection port 6 as seen from an XY plane. Although the planar shape of the step 27 is rectangular in the example shown in FIG. 4B, the present disclosure is not limited to this. The planar shape of the steps 27 may be circular or polygonal. For example, the ejection port 6 may be formed in the center of the planar shape of the step 27, with the length of the step 27 in the X-direction being approximately twice as long as the diameter of the ejection port 6 and the length thereof in the Y-direction being approximately four times as long as the diameter of the ejection port 6.

The second substrate 3 is formed of a Si substrate. As described earlier, the recessed portion 8*a* for forming the pressure chamber 8 between the second substrate 3 and the first substrate 2 is formed at the front surface side (the upper surface side in FIG. 4A) of the second substrate 3. Inside the pressure chamber 8, the first opening 9 is formed, penetrating the recessed portion 8*a* of the second substrate 3. The recessed portion 8*a* and the first opening 9 can be formed by patterning and etching through resist application and photolithography. Other materials such as ceramics, resin, or metal may be used as a material for the second substrate 3. The pressure chambers 8 are formed by joining of the front surface of the second substrate 3 and the back surface (the second surface) of the first substrate 2 with the adhesive 10. Then, regions of the first substrate 2 that are located inside of the joint surface between the first substrate 2 and the second substrate 3 serve as the diaphragm plates 7 each forming one (the upper one in FIG. 4A) of the inner walls of the corresponding pressure chamber 8. Although BCB is used as the adhesive 10 in the present embodiment, it is to be noted that other materials such as ones based on epoxy or silicon polymers may be used, or silicon direct bonding may be used. In a case where a water-based solution is used, a waterproof material is preferably used as the adhesive 10.

In the present embodiment, the second substrate 3 is joined to thin portions of the first substrate 2. As described earlier, the back surface 5*b* of the first substrate 2 forms an uneven shape due to the drive elements, and the portions where the drive elements are formed are thicker than the other portions. Hereinafter, a region where the drive element is formed (a first region) is referred to as a thick portion, and a region where the drive element is not formed is referred to as a thin portion. The second substrate 3 is joined to the thin portions of the first substrate 2. Thus, in each diaphragm plate 7, an encircling outer periphery portion 28 (a second region) between the drive element and the portion where the first substrate 2 and the second substrate 3 are joined together is the thin portion. The thin portion has lower rigidity (modulus of elasticity) than the thick portion. For this reason, the diaphragm plate 7 can be displaced by a larger amount in a case where the outer periphery portion 28 of the diaphragm plate 7 is a thin portion like in the present embodiment than in a case where the outer periphery portion is a thick portion.

The third substrate 4 is formed of a Si substrate. The recessed portion 50*a* for forming the first shared flow channel 50 is formed at the front surface side (the upper surface side in FIGS. 3 and 4A) of the third substrate 4. The second opening 51 and the third opening 52 (see FIG. 3) are formed inside this recessed portion 50*a*, penetrating the recessed portion 50*a* of the third substrate 4. Like the recessed portions 8*a* and the first openings 9 of the second substrate 3, the recessed portion 50*a*, the second opening 51, and the third opening 52 can be formed by patterning and etching through resist application and photography. Also, the third substrate 4 may be made of other materials such as ceramics, resin, or metal. The first shared flow channel 50 can be formed by joining of a surface (the lower surface in FIG. 4A) of the second substrate 3 and a surface (the upper surface in FIG. 4A) of the third substrate 4 with the adhesive 10, the surface of the second substrate 3 being opposite from the surface thereof where the pressure chambers 8 are formed, the surface of the third substrate 4 being where the recessed portion 50a is formed.

The second opening 51 and the third opening 52 formed at the first shared flow channel 50 are each connected to the liquid feed unit 504 (see FIG. 3). In the present embodiment, the liquid feed unit 504 functions as a liquid supply unit (liquid supply unit) that supplies the liquid to the liquid ejection head 100. Thus, connecting the first shared flow channel 50 and the liquid feed unit 504 to each other enables liquid supply from the liquid feed unit 504 to the substrate 1.

Note that the first electrode pad 25 and the second electrode pad 26 formed at the first substrate 2 are connected to the flexible wiring substrate 101 (see FIG. 2). As a result, the substrate 1 can be supplied with electric signals and power needed for liquid ejection sent from the printing apparatus 700. In a case where a water-based solution is used, wall surfaces of the second substrate 3 and the third substrate 4 that come into contact with the solution are preferably provided with a surface protective layer such as SiC, $Al_2O_3$, SiN, and $SiO_2$.

Here, a description is given of supply and discharge of liquid (ink) in the substrate 1 configured as described above. Once liquid is supplied from the liquid feed unit 504 to the second opening 51 and the third opening 52, the liquid is supplied to the pressure chambers 8 through the first shared flow channel (flow channel) 50 and then the respective first openings 9. Then, a suction operation is performed to fill the ejection ports 6 with the liquid supplied to the pressure chambers 8. The suction operation is performed using a suction unit provided at the printing apparatus 700. The suction unit is formed by the cap member that can come into close contact with the surface of the first substrate 2 of the liquid ejection head 100 and the negative pressure generation unit connected to the cap member. The negative pressure generation unit connected to the cap member applies a negative pressure to the space formed by the cap member and the front surface of the substrate 1 with the cap member in close contact with the surface of the substrate 1, thereby sucking gas and ink out of the ejection ports 6 and the pressure chambers 8. As a result of this, the liquid in the pressure chambers 8 is sucked into the ejection ports 6 through the steps 27, and the ejection ports 6 are filled with the ink. Then, once the driving of the negative pressure generation unit is stopped to stop the liquid suction, a meniscus is formed in each ejection port 6 by surface tension of the liquid, and the liquid ejection head 100 is now ready to eject the liquid. In this suction operation, in a case where the front surface 5*a* of the substrate 1 is uneven, the cap member does not come into close contact with the front surface 5*a* of the substrate 1, letting outside air in through the unevenness of the front surface 5*a* and hindering sufficient suction of the air and liquid inside the ejection ports 6 and the pressure chambers 8. Because the front surface 5*a* of the substrate 1 is flat in the configuration of the present embodiment, the air and liquid inside the ejection ports 6 and the pressure chamber 8 can be properly sucked.

After the above-described suction operation, voltage is applied to the second electrode 18 to drive the piezoelectric film 17. Then, the diaphragm plates 7 deform, warping into the pressure chambers 8 and changing (decreasing) the volumes of the pressure chambers 8. Pressure produced by this voltage change causes the liquid supplied to the pressure chambers 8 and the liquid filling the ejection ports 6 to be ejected to the outside. After that, the diaphragm plates 7 that were warping into the pressure chambers 8 return to their original states, which allows the liquid to be supplied from the second opening 51 and the third opening 52 and enables a meniscus to be formed in each of the ejection ports 6.

Driving of the piezoelectric film 17 can be controlled by the direction and magnitude of the voltage applied. For example, the diaphragm plates 7 warp in a direction to increase the volumes of the pressure chambers 8 first and then in a direction to decrease the volumes of the pressure chambers 8 next. This can change the volumes of the pressure chambers 8 greatly and therefore can increase pressure change for ejection. Controlling the volume change of the pressure chamber 8 enables control of the amount and speed of liquid ejection.

After liquid ejection is performed for a while, foreign matter such as minute droplets and dust may attach to the front surface 5*a* of the substrate 1, hindering normal ejection from the ejection ports 6. For this reason, in addition to the above-described liquid suction operation using the cap member, the printing apparatus 700 performs a wipe operation to wipe the droplets and dust off with a wiper as a wiping unit provided at the printing apparatus 700. In this event, the wipe operation cannot be performed satisfactorily in a case where the substrate 1 has an uneven surface. However, because the front surface 5*a* of the substrate 1 of the present embodiment is formed flatly, foreign matter such as droplets and dust can be wiped off properly.

Also, in the substrate 1 of the present embodiment, the steps 27 are formed at the lower surface (the second surface) of the first substrate 2, communicating with the ejection ports 6. The formation of the steps 27 makes it easier for the pressure generated by contraction of the pressure chambers 8 to escape in the direction toward the steps 27 and therefore improves the straightness of the ejected liquid.

Further, the substrate 1 of the present embodiment is configured such that the thickness of the diaphragm plate 7 is reduced locally. Specifically, each outer periphery portion 28 of the substrate 1 is formed to be thinner than the region where the drive element is formed, which is inside of the outer periphery portion 28. Forming the outer periphery portion 28 of the diaphragm plate 7 as a thin portion in this way makes the outer periphery portion 28 less rigid than the other portions and makes the diaphragm plate 7 more displaceable upon driving of the piezoelectric film 17. For this reason, applying a low voltage to the piezoelectric film 17 is enough for the diaphragm plate 7 to achieve a sufficient amount of displacement, enabling a proper amount of ink to be ejected from the ejection port.

Although a case where the liquid feed unit 504 supplies liquid from both of the second opening 51 and the third opening 52 is described in the present embodiment, it is to be noted that the present disclosure is not limited to this. It is also possible to make one of the second opening 51 and the third opening 52 serve as a liquid supply opening and the other one serve as a liquid collection opening. In this case, a circulation unit is used as the liquid feed unit 504, the circulation unit having a function as a liquid supply unit that supplies liquid to the liquid ejection head 100 and a function as a liquid collection unit that collects the liquid from the liquid ejection head 100. Then, the ink supply end of the circulation unit is connected to one of the openings, and the ink collection end of the circulation unit is connected to the other opening. This enables ink to be supplied to the ejection ports 6 while flowing from the one opening to the other opening of the first shared flow channel 50. In other words, the ejection operation of the liquid ejection head 100 can be performed with the ink being circulated between the liquid feed unit 504 and the liquid ejection head 100. Such ink circulation enables removal of air bubbles present in the pressure chambers 8 and the first shared flow channel 50 and therefore enables the liquid ejection head 100 to maintain more proper ejection performance.

An example is shown here of approximate calculation of the rigidity of the diaphragm plate 7 as warpage of a flat plate, based on the specific configuration of the substrate 1 of the present embodiment. Similar approximate calculation is performed also on a first comparison example having the configuration in Japanese Patent Laid-Open No. 2014-172323 in which a film is formed at the surface of the substrate, and a comparison is made between the substrate 1 of the present embodiment and that of the first comparison example.

Formula 1 is an approximate expression for finding a position λ of the neutral plane of the substrate, Formula 2 is an expression for calculating an apparent Young's modulus E of the diaphragm plate, and Formula 3 is an approximate expression for the amount of warpage u of the diaphragm plate. In these Formulae, Ei is the Young's modulus of each layer, ti is the thickness of each layer, W is the width of the diaphragm plate 7, hi is a distance in a thickness direction measured with the front surface 5*a* of the substrate being zero, h is the thickness of the diaphragm plate 7, and p is pressure acting on the diaphragm plate.

$$\lambda = \frac{\sum_{j=1}^{n} E_i\left(h_i^2 - h_{i-1}^2\right)}{2\sum_{i=1}^{n} E_i t_i} \quad \text{(Formula 1)}$$

$$E = \frac{4}{h^3}\sum_{i=1}^{n} E_i\left\{(h_i-\lambda)^3 - (h_{i-1}-\lambda)^3\right\} \quad \text{(Formula 2)}$$

$$u = 0.03 \times \frac{p \times (W)^4}{Eh^3} \quad \text{(Formula 3)}$$

The film thickness and the Young's modulus of the first substrate 2 forming the substrate 1 are as follows. The insulating film 12 made of $SiO_2$ has a thickness of 1 μm and a Young's modulus of 70 GPa. The silicon layer 13 has a thickness of 2 μm and a Young's modulus of 210 GPa. The insulating film 14 made of $SiO_2$ has a thickness of 0.5 μm and a Young's modulus of 70 GPa. Also, the first electrode 16 made of Pt has a thickness of 0.13 μm and a Young's modulus of 168 GPa. The lead diffusion prevention film made of $TiO_2$ and located between the insulating film 14 and the first electrode 16 has a thickness of 0.05 μm and a Young's modulus of 168 GPa. The contact improvement layer made of Ti and located between the lead diffusion prevention film and the first electrode 16 has a thickness of 0.05 μm and a Young's modulus of 116 GPa. The piezoelectric film 17 has a thickness of 2 μm and a Young's modulus of 53 GPa. The second electrode 18 made of TiW has a thickness of 0.1 μm and a Young's modulus of 345 GPa. The first insulating film 19 made of $SiO_2$ has a thickness of 0.4 μm and a Young's modulus of 70 GPa. The first protective film 20 made of SiN has a thickness of 0.2 μm and a Young's modulus of 270 GPa. Also, the diaphragm plate 7 is sized such that the width is 90 μm and the length is 500 μm.

Figure 5:
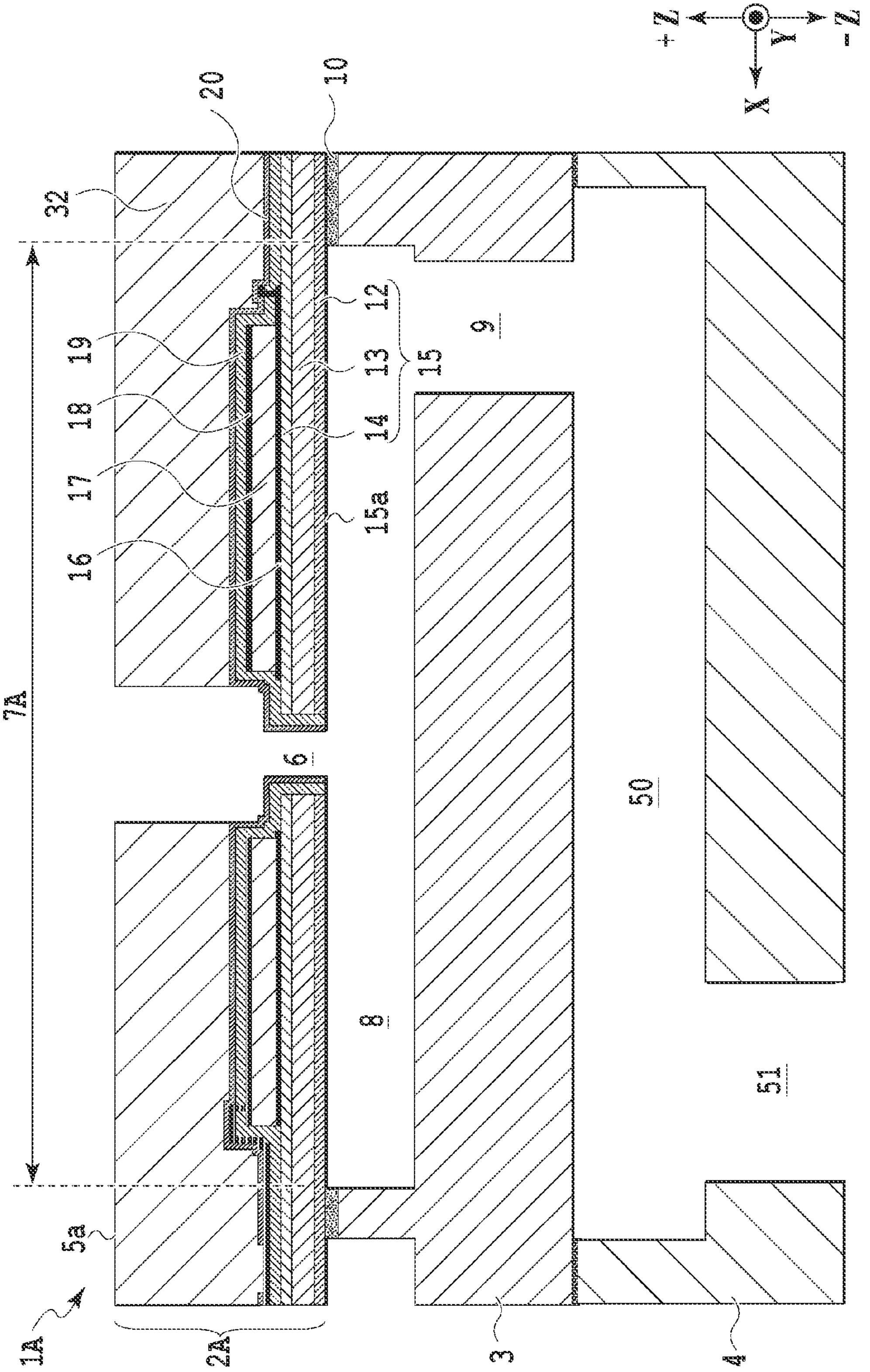
FIG. 5 is a sectional view showing part of a substrate of a first comparative example in an enlarged manner.

Meanwhile, FIG. 5 shows the configuration of a substrate 1A of the first comparative example of the present embodiment. The substrate 1A of the first comparative example is configured such that a protective film 32 made of polyimide is formed to cover the unevenness formed at the surface of the substrate, like in Japanese Patent Laid-Open No. 2014-172323. Like the present embodiment, the substrate 1A of the first comparative example includes a first substrate 2A, the second substrate 3, and the third substrate 4. The first substrate 2A has the same stack structure as the first substrate 2 of the present embodiment, except that the protective film 32 is provided. Note that the front surface and the back surface of the first substrate 2A in the first comparative example are opposite in orientation from the front surface and the back surface of the first substrate 2 in the first embodiment. Specifically, at the first substrate 2A of the first comparative example, an outer surface 15*a* of the base substrate 15 forms an inner wall of each pressure chamber 8, and the surface including the drive elements and having an uneven shape is located at the front surface side (the upper surface side in FIG. 5) of the substrate 1A. Then, the uneven shape formed at the front surface side of the first substrate 2A is covered by the protective film 32 formed of polyimide, and the front surface 5*a* of the first substrate 2A is formed as a flat planar shape. The protective film 32 formed of polyimide has a thickness of 4 μm and a Young's modulus of 4 GPa. Here, the distance between the position λ of the neutral plane and the piezoelectric film 17 is calculated for each of the substrate 1 and the substrate 1A. Note that the position % of the neutral plane and the position of the piezoelectric film 17 indicate a distance in the Z-direction from the outer surface (the upper surface in FIG. 4A) of the base substrate 15, measured with the outer surface of the base substrate 15 being a reference position in the Z-direction (Z=0). The distance between the outer surface of the base substrate 15, which is a reference position, to the piezoelectric film 17 is 3.73 μm in both of the substrates 1 and 1A. Also, the position λ of the neutral plane of each of the substrates 1 and 1A can be found using Formula 1. As a result of the calculation using Formula 1, the position λ of the neutral plane is found to be −2.98 μm in the substrate 1 of the present embodiment. Hence, the distance in the Z-direction between the neutral plane and the piezoelectric film 17 is 0.75 μm, and the apparent thickness of the diaphragm plate 7 in the substrate 1 is 5.96 μm (=2.98 μm×2). By contrast, in the substrate 1A of the first comparative example, the position λ of the neutral plane is −3.08 μm, the distance in the Z-direction between the neutral plane and the piezoelectric film is 0.64 μm, and the apparent thickness of the diaphragm plate 7 in the substrate 1A is 6.16 μm (=3.08 μm×2). In this way, the substrate 1 of the present embodiment has a larger apparent thickness of the diaphragm plate 7 and is easier to warp. Note that the apparent Young's modulus E indicating the rigidity of the diaphragm plate 7 of each of the substrates 1 and 1A can be calculated with Formula 2 using the position λ of the neutral plane found using Formula 1, the thickness h of the diaphragm plate 7, and the like.

Next, the warpage amount p of the diaphragm plate 7 is calculated for each of the substrates 1 and 1A. The warpage amount p is calculated with Formula 3 using the thickness h of the diaphragm plate 7, the apparent Young's modulus E found with Formula 2, and the pressure p acting on the diaphragm plate 7. In a case where the pressure p acting on the diaphragm plate 7 is 1 MPa, the amount of warpage of the diaphragm plate 7 is 65.7 μm in absolute value in the substrate 1 of the present embodiment. By contrast, in the substrate 1A of the first comparative example, the warpage amount of a diaphragm plate 7A is 54.8 μm in absolute value. Thus, the diaphragm plate 7 of the present embodiment has a larger warpage amount than the diaphragm plate 7A of the first comparative example and is therefore preferable. In order for the substrate 1A of the first comparative example to achieve the same warpage amount as the substrate 1 of the present embodiment, it is necessary to increase the driving voltage or increase the width or length of the diaphragm plate 7. Increasing the driving voltage puts a larger load on the driving circuit and is therefore not preferable. Also, increasing the width or length of the diaphragm plate 7 leads to a lower resolution of an image formed, an increase in the size of the substrate 1A, and the like, which in turn leads to a decrease in the performance of the printing apparatus, an increase in manufacturing costs, a decrease in the degree of design freedom, and the like.

As thus described, the front surface 5*a* is formed flatly in the substrate 1 of the present embodiment because of the base substrate 15. Thus, liquid suction and wipe operations can be performed properly without a protective film provided to flatten the front surface 5*a* of the substrate 1. Also, the diaphragm plates 7 can be displaced properly with a lower driving voltage.

Figure 6:
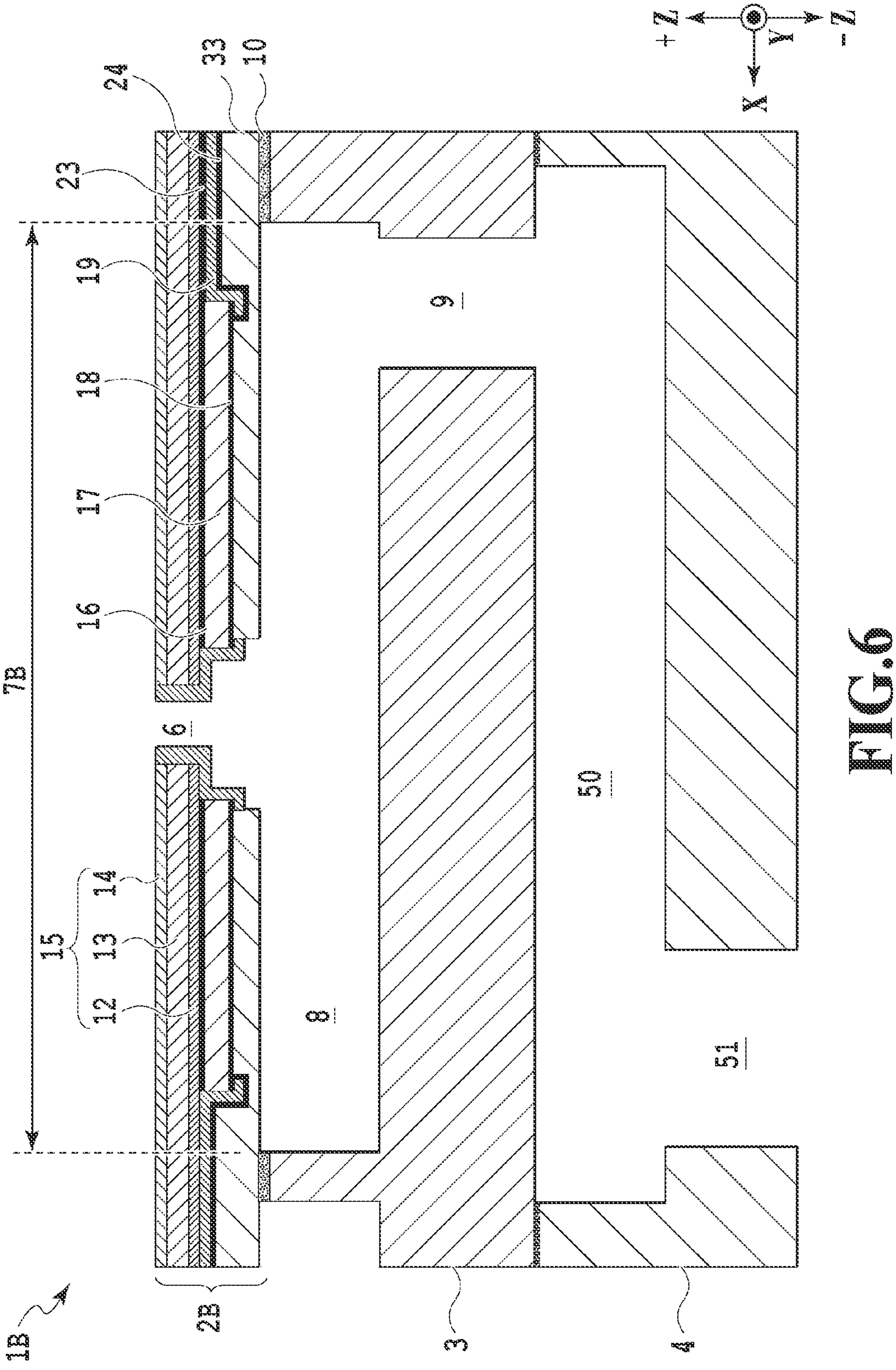
FIG. 6 is a sectional view showing part of a substrate of a second comparative example in an enlarged manner.

Next, the advantageous effects produced by the thin formation of the outer periphery portion 28 of each diaphragm plate 7 of the substrate 1 are described in comparison with the comparative examples of the present embodiment. Note that FIG. 5 shows the first comparative example described above, FIG. 6 shows a second comparative example, and FIG. 7 shows a third comparative example.

The substrate 1A of the first comparative example shown in FIG. 5 is such that, as described above, the polyimide protective film 32 is added based on the configuration of the first substrate 2 of the present embodiment so that the front surface 5*a* of the substrate 1A may be flat, and the substrate 1A has the diaphragm plates 7A configured imitating the configuration in Japanese Patent Laid-Open No. 2014-172323. A substrate 1B of the second comparative example shown in FIG. 6 includes diaphragm plates 7B having the base substrate 15 similar to that in the present embodiment and the piezoelectric film 17, the first electrode 16, and the second electrode 18 similar to those in the present embodiment. However, a first substrate 2B of the second comparative example differs from the first substrate 2 of the present embodiment in the following point. Specifically, in the formation of the first substrate 2B of the second comparative example, after the ejection ports 6 are formed, the first insulating film 19 is formed, and patterning and etching are performed through resist application and photolithography to expose part of the second electrode 18. After that, the second electric wiring 24 is formed, and a Ni film 33 is formed by electroforming to cover the second electrode 18 and the second electric wiring 24. The Ni film 33 has a thickness of 0.2 μm and a Young's modulus of 199 GPa. In this way, the diaphragm plate 7B of the substrate 1B of the second comparative example is configured such that the Ni film 33 is formed on the lower surface side of the piezoelectric film 17, having a configuration imitating the substrate shown in Japanese Patent Laid-Open No. 2012-71587.

Figure 7:
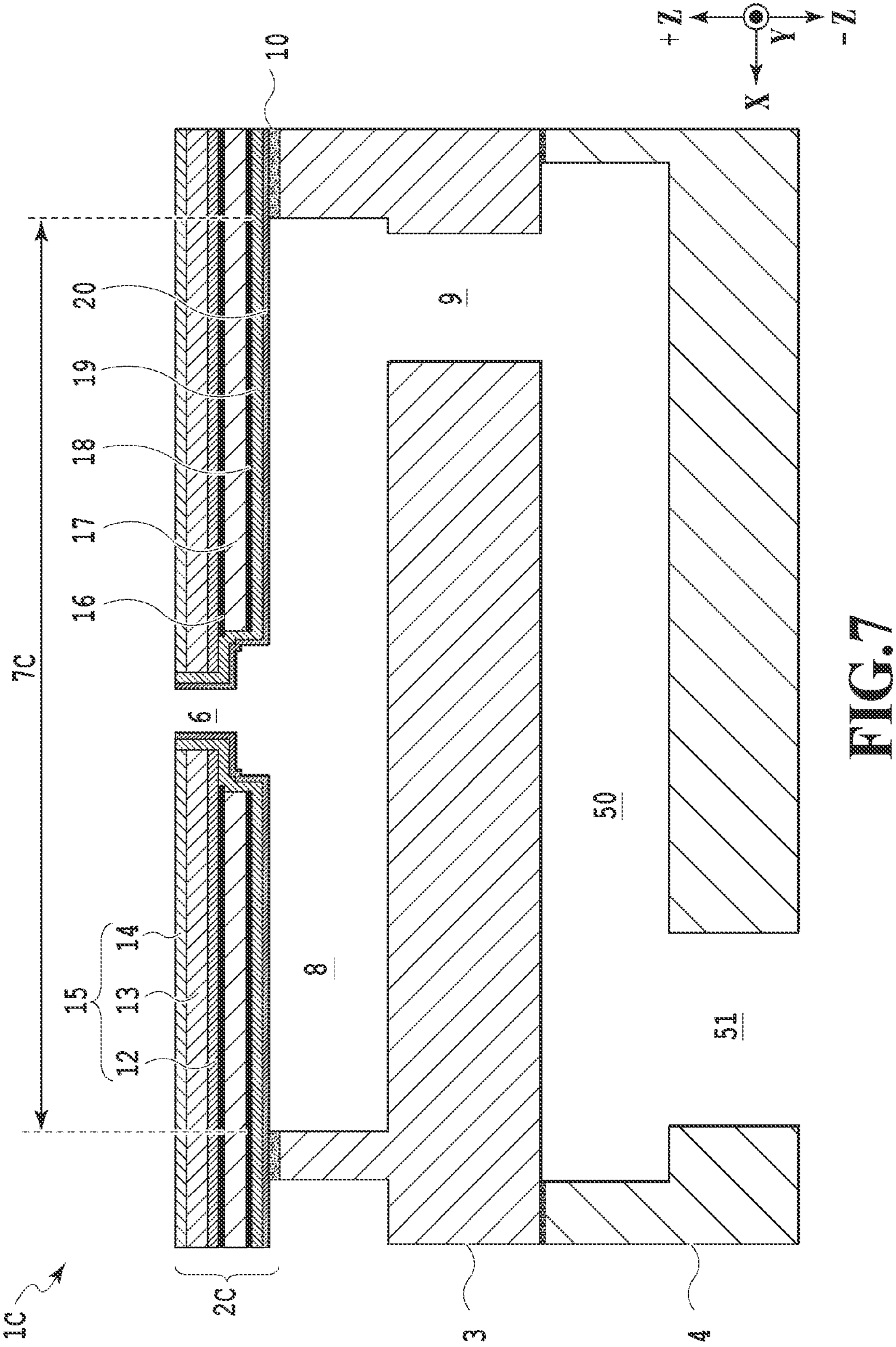
FIG. 7 is a sectional view showing part of a substrate of a modification of a first embodiment in an enlarged manner.

Also, a substrate 1C of the third comparative example shown in FIG. 7 is configured such that drive elements having the same layer structure as those of the present embodiment are provided over the entire region of the back surface (the lower surface in FIG. 7) of the base substrate 15. In other words, a diaphragm plate 7C of a first substrate 2C of the substrate 1C of the third comparative example is configured without the thin outer periphery portion 28 in the substrate 1 of the present embodiment.

Three-dimensional model structures of these substrates 1, 1A, 1B, and 1C were created, voltage was applied to the first electrode 16 and the second electrode 18, and structure analysis was conducted using the finite element method. After the calculation, the displacement volumes of the pressure chambers 8 per unit voltage (pL/V) were found, and the values were standardized based on the configuration of the substrate 1 of the present embodiment shown in FIG. 4A. FIG. 8 shows those standardized values. Because the value of the displacement volume of the pressure chamber 8 per unit voltage (pL/V) is proportional to the ejection amount, a larger displacement volume of the pressure chamber 8 achieves the same ejection amount with a lower voltage and is therefore preferable.

As shown in FIG. 8, with the displacement volume of the pressure chamber 8 in the substrate 1 of the present embodiment shown in FIG. 4A being set to "1," the ratio of the displacement volume of the pressure chamber 8 of the substrate 1A shown in FIG. 5 and imitating Japanese Patent Laid-Open No. 2014-172323 is 0.43. Thus, the results show that in order for the substrate 1A to achieve the same ejection amount as the substrate 1, twice or more driving voltage needs to be applied. Also, the ratio of the displacement volume of the pressure chamber 8 of the substrate 1B shown in FIG. 6 and imitating Japanese Patent Laid-Open No. 2012-71587 is 0.03. Further, the ratio of the displacement volume of the pressure chamber 8 of the substrate 1C shown in FIG. 7 in which the outer periphery portion 28 of the diaphragm plate 7C is not thin is 0.09. Thus, the results show that the substrates 1B, 1C also need application of higher drive voltage than the substrate 1A. In this way, the first substrate 2 of the present embodiment in which the outer periphery portion 28 of the diaphragm plate is formed as a thin portion makes it possible to drive the diaphragm plate 7 with a lower driving voltage.

As thus described, the liquid suction and wipe operations can be performed satisfactorily on the substrate 1 of the present embodiment because the front surface 5*a* thereof is formed flatly. Further, because the diaphragm plate 7 is configured to easily warp, a proper amount of displacement of the diaphragm plate 7 can be achieved with a low drive voltage.

Second Embodiment

Figure 9:
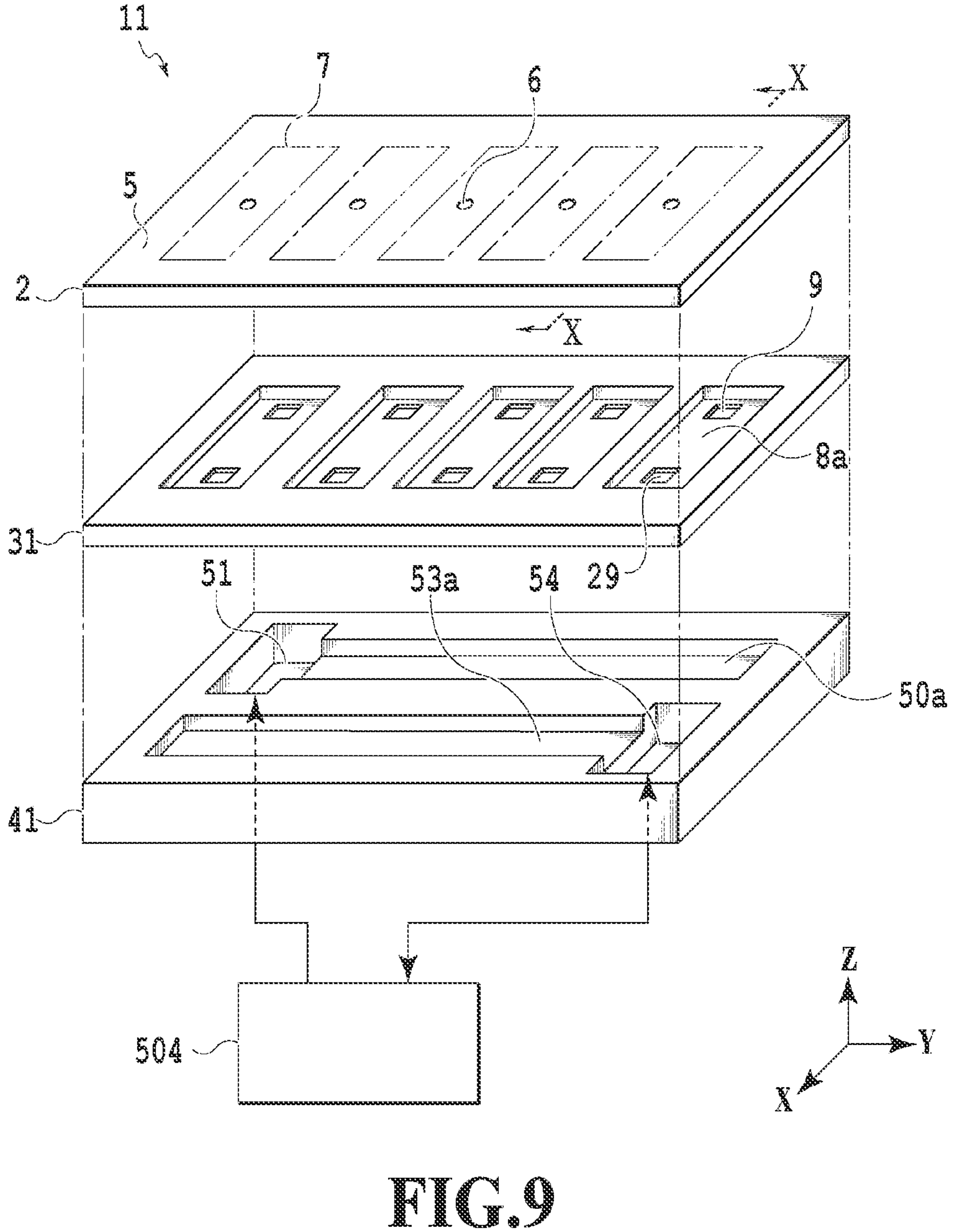
FIG. 9 is an exploded perspective view showing part of a substrate of a second embodiment in an enlarged manner.
Figure 10:
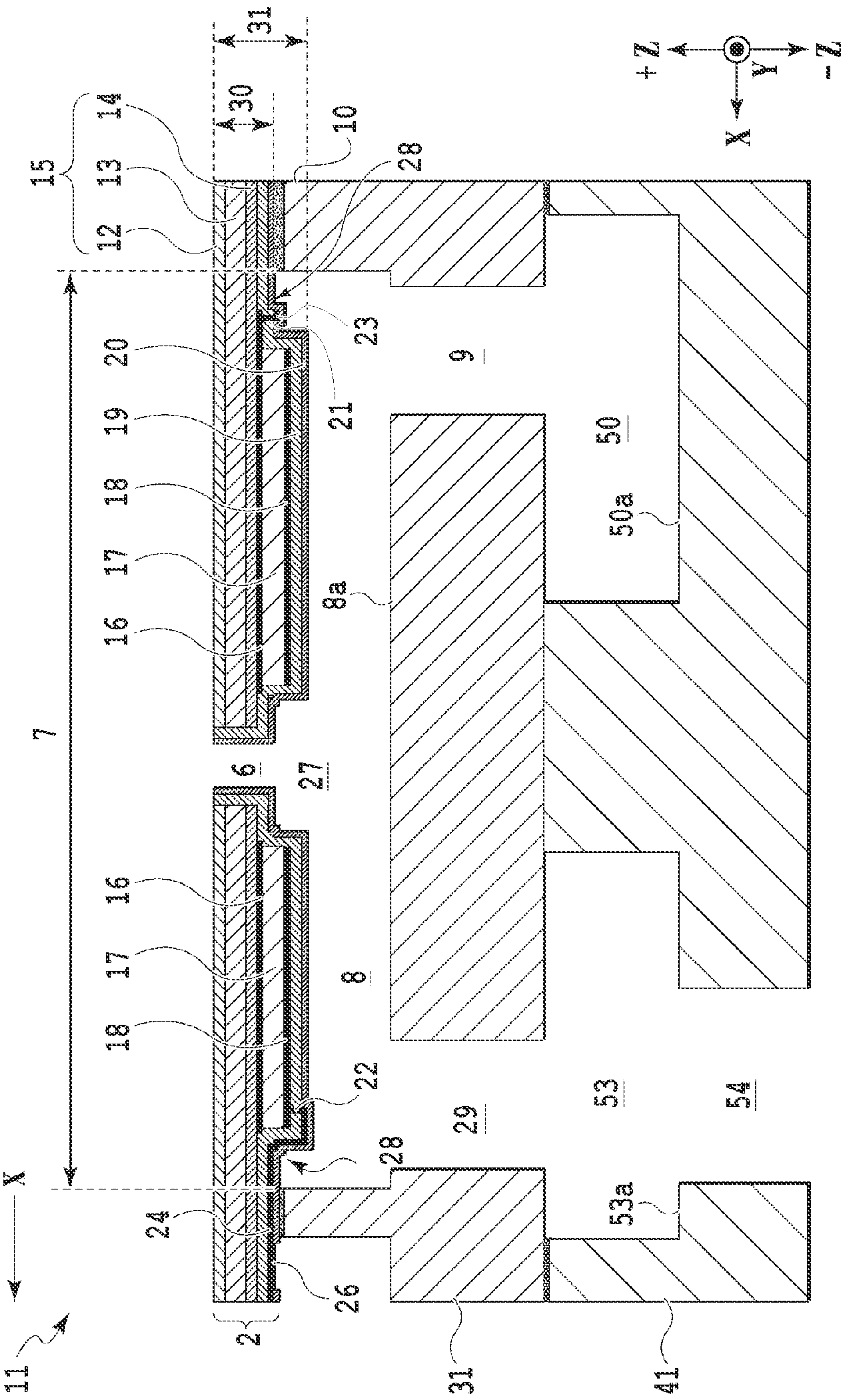
FIG. 10 is a sectional view taken along the line X-X in FIG. 9.

Next, a second embodiment of the present disclosure is described. FIG. 9 is a schematic diagram enlarging part of a substrate 11 forming a liquid ejection head of the present embodiment, and FIG. 10 is a sectional view taken along the line X-X in FIG. 9. For simplification. FIG. 9 shows a configuration where the substrate 11 has five ejection ports 6 arranged in the Y-direction.

As shown in FIG. 9, the substrate 11 of the present embodiment is formed by the first substrate 2, a second substrate 31, and a third substrate 41, and these substrates 2, 31, 41 are created using the same materials and methods shown in the first embodiment described earlier. The structures of the second substrate 31 and the third substrate 41 are what is different from the first embodiment, and the first substrate 2 is the same as that shown in the first embodiment. Note that in FIGS. 9 and 10, portions that are the same as or corresponding to those in the first embodiment are denoted by the same reference numerals as those used in the first embodiment.

At the second substrate 31, in addition to the pressure chambers 8 and the first openings (the first pressure chamber openings) 9, fourth openings (second pressure chamber openings) 29 are formed, penetrating the second substrate 31 in the recessed portions (the first recessed portions) 8*a* for forming the pressure chambers 8. At the third substrate 41, the recessed portion 50*a* for forming the first shared flow channel (the first flow channel) 50 and the second opening (the first shared flow channel opening) 51 are formed, the second opening 51 being located inside the recessed portion 50*a* and penetrating the third substrate 41. In addition, at the third substrate 41, a recessed portion (a third recessed portion) 53*a* for forming a second shared flow channel (a second flow channel) 53 and a fifth opening (a second flow channel opening) 54 are formed, the fifth opening 54 being located inside the recessed portion 53*a* and penetrating the third substrate 41. The first shared flow channel 50 and the second shared flow channel 53 are formed by joining of the back surface (the lower surface in FIGS. 9 and 10) of the second substrate 31 and the front surface (the upper surface in FIGS. 9 and 10) of the third substrate 41 with the adhesive 10.

In the substrate 11 of the present embodiment having the configuration described above, the second opening 51 and the fifth opening 54 formed at the third substrate 41 are connected to a liquid circulation unit 504 as a liquid sending unit. Specifically, one of the second opening 51 and the fifth opening 54 is connected to the supply port of the liquid circulation unit 504, and the other one is connected to the collection port of the liquid circulation unit 504. In this example, the second opening 51 is connected to the liquid supply port of the liquid circulation unit 504, and the fifth opening 54 is connected to the liquid collection port of the liquid circulation unit 504. The liquid circulation unit 504 can thus supply liquid to the substrate 11 and collect the liquid from the substrate 11. Note that in a case where a water-based solution is used, the second substrate 31 and the third substrate 41 are preferably provided with a surface protective layer such as SiC, $Al2O_3$, SiN, or $SiO_2$ on their wall surfaces to come into contact with the solution. The first electrode pad 25 (see FIG. 4B) and the second electrode pad 26 that are formed at the first substrate 2 are connected to the flexible wiring circuit 101, which allows electric signals necessary for liquid ejection to be applied to the substrate 11.

A description is now given of supply and ejection of liquid (ink) in the present embodiment. Once the liquid is supplied from the liquid circulation unit 504 to the second opening 51, the liquid is supplied to the pressure chambers 8 through the first shared flow channel 50 and then the respective first openings 9. Then, the liquid (ink) that has flowed into the pressure chambers 8 flows into the second shared flow channel 53 through the fourth openings 29, and after that, the liquid flows out of the substrate 11 through the fifth opening 54 and is collected by the liquid circulation unit 504. Next, once the negative pressure generation unit applies a negative pressure to the inside of the above-described cap member in close contact with the flat surface of the substrate 11, the liquid supplied into the pressure chambers 8 moves to the ejection ports 6 through the steps 27, filling the ejection ports 6 with the ink. Once the liquid suction is stopped, a meniscus is formed in each ejection port 6 due to the surface tension of the liquid. Once voltage is applied between the first electrode 16 and the second electrode 18 in this state to drive the piezoelectric film 17, the volumes of the pressure chambers change like in the first embodiment, and the following operations are sequentially performed: ejecting liquid from the ejection ports 6, filling the ejection ports 6, and forming a meniscus.

As thus described, in the present embodiment, liquid circulates between the liquid circulation unit 504 and the substrate 11, and the liquid in the pressure chambers 8 is constantly flowing from the first openings 9 to the fourth openings 29. Meanwhile, the steps 27 are formed at the diaphragm plates 7 at the first substrate 2 forming the inner walls of the pressure chambers 8, surrounding the respective ejection ports 6. Thus, what is called ejection-port internal circulation is performed in which the liquid that has flowed into each pressure chamber 8 enters the region where the step 27 is formed, goes further into an area near the meniscus formation position in the ejection port 6, and after that, flows out to the pressure chamber 8.

Meanwhile, in a case of an inkjet printing apparatus that performs no ink circulation, a solvent component evaporates from the ejection ports 6 in a standby period in which ink is not ejected, and thus a pigment, a dye, or other component contained in the liquid easily gets attached and fixed to the inner walls or the surfaces of the ejection ports 6. Thus, after ejection is resumed, it is likely that the thickened ink causes ejection failures, such as liquid ejected not straight or liquid not ejected at all. To avoid this, in the present embodiment, the liquid is circulated between the liquid ejection head 100 and the liquid circulation unit 504 even during the standby period in which ejection is not performed, and each step 27 allows the liquid that has flowed into the pressure chamber 8 to flow to an area near the meniscus formation position in the ejection port 6. This makes an increase in the liquid viscosity less likely and helps prevent ejection failures from occurring. As described in the first embodiment, the steps 27 in the present embodiment also can improve the straightness of the ejected liquid, and favorable ejection performance can be maintained over a long period of time.

Preferably, the thickness of each ejection port 6 in the ejection direction is changed to achieve a desirable amount of droplets, by adjusting the balance with the size of the ejection port 6. The steps 27 in the present embodiment are formed by encircling recessed portions formed in portions of the first substrate 2 other than the base substrate 15. However, in a case where the ejection ports 6 are to be increased in thickness, the ejection ports 6 may be formed including the layers of the first substrate 2 other than the base substrate 15 as well. The following gives a specific description using FIG. 11.

Figure 11:
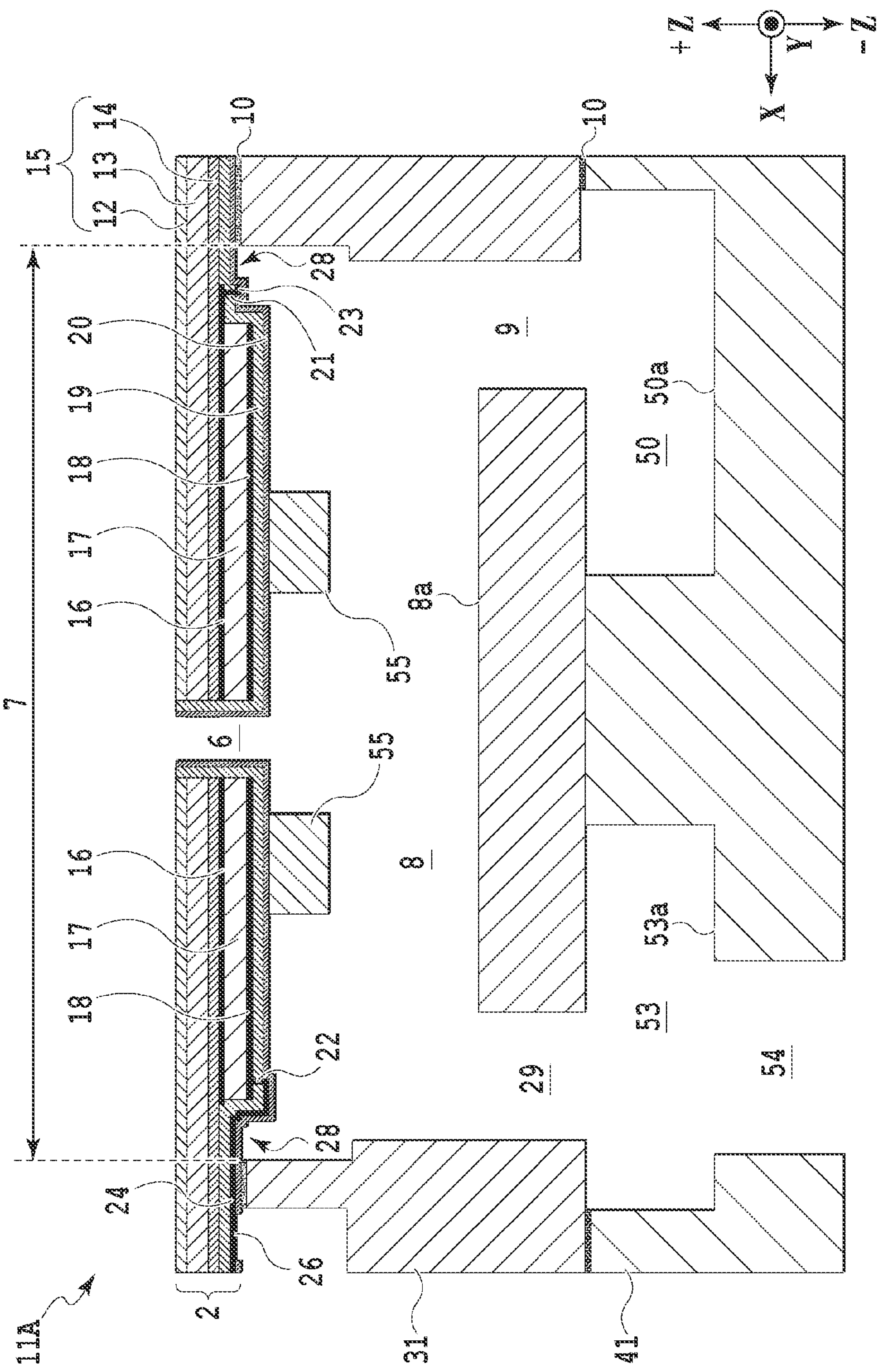
FIG. 11 is a sectional view showing part of a substrate of a modification of the second embodiment in an enlarged manner.

FIG. 11 is a sectional view showing a substrate 11A of a modification of the present embodiment. The ejection port 6 of the substrate 11A shown in FIG. 11 penetrates the base substrate 15, the first electrode 16, the piezoelectric film 17, the second electrode 18, the first insulating film 19, and the first protective film 20. The first protective film 20 is unnecessary unless the solution is water-based. An encircling protruding portion is formed at the first protective film 20 on its surface at the pressure chamber 8 side (the lower surface in FIG. 11), the protruding portion being made of a material with a low Young's modulus, such as resin, or, for example, polyimide. The encircling protruding portion forms a step 55 communicating with the ejection port 6. Even with a thicker ejection port 6, this step 55 can improve the straightness of ejected droplets and lead the liquid that has flowed into the pressure chamber 8 to the ejection port 6, achieving the ejection-port internal circulation. Further, the step 55 is provided locally in the diaphragm plate 7, and thus the formation of the step 55 contributes very minimally to change in the displacement of the diaphragm plate 7 and is therefore not problematic.

As thus described, according to the present embodiment and the modification thereof, like in the first embodiment described earlier, liquid suction and wipe operations can be performed properly, and also, the diaphragm plates can achieve a proper amount of displacement. Further, according to the present embodiment and the modification, supply and collection of liquid to and from the pressure chambers 8 can be done smoothly, and in-nozzle liquid circulation can be properly performed by the steps 27 and 55. Thus, it is possible to help prevent ejection failures from being caused by evaporation of a solvent component in the ink from the ejection ports 6 and also to improve the straightness of the ejected liquid using the steps 27 or 55. As a result, favorable liquid ejection performance can be maintained over a long period of time.

Other Embodiments

Although a full-line printing apparatus and a liquid ejection head applied thereto are described as examples in the above embodiments, the present disclosure is not limited to them. The present disclosure can also be applied to a serial printing apparatus that performs printing while moving a liquid ejection head in a main scanning direction and to the liquid ejection head used in the serial printing apparatus.

The present disclosure can provide a liquid ejection head and a printing apparatus including the same, the liquid ejection head being suitable for liquid suction and wipe operations and enabling diaphragm plates to achieve proper amounts of displacement with lower drive voltage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-129055, filed Aug. 12, 2022, which is hereby incorporated by reference herein in its entirety.

What is claimed is:

1. A liquid ejection head comprising:

a first substrate having a first surface and a second surface, the first surface being flat and provided with an ejection port for ejecting liquid, the second surface being opposite from the first surface and provided with a drive element; and a second substrate joined to the second surface of the first substrate and forming a pressure chamber between the second substrate and the second surface of the first substrate, the pressure chamber being configured to be supplied with the liquid, wherein a portion of the first substrate that forms the pressure chamber forms a diaphragm plate to be displaced by the drive element and is configured to eject the liquid in the pressure chamber from the ejection port upon displacement of the diaphragm plate, and the second surface of the first substrate has a first region, surrounding the ejection port, where the drive element is positioned to protrude into the pressure chamber, a second region, surrounding the first region, where a wire for supplying electrical power to the drive element is positioned, and a third region, surrounding the second region, to which the second substrate is joined.

2. The liquid ejection head according to claim 1, wherein the second region is formed more thinly and less rigid than the first region.

3. The liquid ejection head according to claim 1, wherein the first substrate is formed of a base substrate forming the first surface and a drive element provided on the base substrate.

4. The liquid ejection head according to claim 3, wherein the first region is formed including the base substrate and the drive element, the second region is formed including the base substrate and the wire, and the third region is formed including the base substrate.

5. The liquid ejection head according to claim 1, wherein the drive element has a piezoelectric film, a first electrode provided at one surface of the piezoelectric film, a second electrode provided at the other surface of the piezoelectric film opposite from the one surface of the piezoelectric film, and an insulating film provided at the second electrode.

6. The liquid ejection head according to claim 1, wherein a first recessed portion for forming the pressure chamber is formed at one surface of the second substrate, and the pressure chamber is formed by the first recessed portion and the diaphragm plate by joining of the one surface of the second substrate and the second surface of the first substrate at the third region.

7. The liquid ejection head according to claim 6, wherein a pressure chamber opening is formed at the second substrate, penetrating the second substrate and communicating with the pressure chamber.

8. The liquid ejection head according to claim 7, further comprising a third substrate joined to the other surface of the second substrate which is opposite from the one surface of the second substrate, wherein a flow channel is formed between the third substrate and the second substrate, communicating with the pressure chamber opening, and a flow channel opening is formed at the third substrate, penetrating the third substrate and communicating with the flow channel.

9. The liquid ejection head according to claim 8, wherein the flow channel opening includes a first flow channel opening and a second flow channel opening that are connected to a liquid supply unit, and the liquid supplied from the first flow channel opening and the second flow channel opening to the flow channel is supplied to the pressure chamber and the ejection port through the pressure chamber opening.

10. The liquid ejection head according to claim 9, wherein a second recessed portion for forming a first flow channel is formed at one surface of the third substrate, the first flow channel is formed by joining of the other surface of the second substrate and the one surface of the third substrate, and the first flow channel opening and the second flow channel opening are formed at the second recessed portion, penetrating the third substrate.

11. The liquid ejection head according to claim 8, wherein the flow channel opening includes a first flow channel opening connected to a liquid supply unit and a second flow channel opening connected to a liquid collection unit, the liquid supplied from the first flow channel opening to the flow channel is supplied to the second flow channel opening and is also supplied to the ejection port through the pressure chamber opening and the pressure chamber, and the liquid supplied to the second flow channel opening flows out to the liquid collection unit.

12. The liquid ejection head according to claim 8, wherein the pressure chamber opening includes a first pressure chamber opening and a second pressure chamber opening, the flow channel includes a first flow channel communicating with the first pressure chamber opening and a second flow channel communicating with the second pressure chamber opening, the flow channel opening includes a first flow channel opening communicating with the first flow channel and connected to a liquid supply unit and a second flow channel opening communicating with the second flow channel and connected to a liquid collection unit, the liquid supplied to the first flow channel through the first flow channel opening is, after being supplied to the pressure chamber through the first pressure chamber opening, supplied to the second pressure chamber opening and also supplied to the second pressure chamber opening after passing through the ejection port, and the liquid supplied to the second pressure chamber opening flows out to the liquid collection unit through the second flow channel and the second flow channel opening.

13. The liquid ejection head according to claim 12, wherein a second recessed portion for forming the first flow channel and a third recessed portion for forming the second flow channel are formed at one surface of the third substrate, the first flow channel and the second flow channel are formed by joining of the second surface of the second substrate and the first surface of the third substrate, the first flow channel opening is formed at the second recessed portion, penetrating the third substrate, and the second flow channel opening is formed at the third recessed portion, penetrating the third substrate.

14. The liquid ejection head according to claim 1, wherein a step is formed at the second surface of the first substrate, surrounding the ejection port and allowing communication between the pressure chamber and the ejection port so that a space becomes stepwise narrower toward the ejection port, and the step is formed in a region closer to the ejection port than the first region.

15. The liquid ejection head according to claim 14, wherein the step is formed by an encircling recessed portion formed closer to the ejection port than the first region at the second surface.

16. The liquid ejection head according to claim 14, wherein the step is formed by an encircling protruding portion formed in the first region at the second surface.

17. The liquid ejection head according to claim 1, wherein a protective film is formed at a portion to come into contact with the liquid or outside air.

18. A printing apparatus comprising:

a liquid ejection head;

a conveyance unit configured to convey a printing medium relative to the liquid ejection head; and a liquid supply unit configured to supply liquid to the liquid ejection head, wherein the printing apparatus forms an image on the printing medium by ejecting the liquid supplied from the liquid supply unit from an ejection port of the liquid ejection head to the printing medium, wherein the liquid ejection head includes:

a first substrate having a first surface and a second surface, the first surface being flat and provided with an ejection port for ejecting liquid, the second surface being opposite from the first surface and provided with a drive element, and a second substrate joined to the second surface of the first substrate and forming a pressure chamber between the second substrate and the second surface of the first substrate, the pressure chamber being configured to be supplied with the liquid, a portion of the first substrate that forms the pressure chamber forms a diaphragm plate to be displaced by the drive element and is configured to eject the liquid in the pressure chamber from the ejection port upon displacement of the diaphragm plate, and the second surface of the first substrate has a first region, surrounding the ejection port, where a drive element is positioned to protrude into the pressure chamber, a second region, surrounding the first region, where a wire for supplying electrical power to the drive element is positioned, and a third region, surrounding the second region, to which the second substrate is joined.

19. The printing apparatus according to claim 18, further comprising a liquid collection unit that collects the liquid supplied to the liquid ejection head.

20. The printing apparatus according to claim 19, wherein the liquid supply unit and the liquid collection unit are formed by a circulation unit, and the liquid is circulated between the circulation unit and the liquid ejection head.

21. The printing apparatus according to claim 18, wherein the second region is formed more thinly and less rigid than the first region.

* * * * *